United States Patent

Romick et al.

[15] 3,700,120

[45] Oct. 24, 1972

[54] APPARATUS FOR COLLECTING AND DISCHARGING LUMBER

[72] Inventors: Roscoe B. Romick; John G. Strauss, both of Portland, Oreg.

[73] Assignee: U.S. Natural Resources, Inc., Portland, Oreg.

[22] Filed: Aug. 2, 1971

[21] Appl. No.: 168,103

[52] U.S. Cl.................214/16 B, 209/74 R, 214/6 H
[51] Int. Cl. ..........................B65g 65/42, B07c 3/08
[58] Field of Search.....214/16 R, 16 B, 6 H, 85, 501, 214/77 R, 130 R; 209/74 R; 298/18

[56] References Cited

UNITED STATES PATENTS

| | | | |
|---|---|---|---|
| 2,998,133 | 8/1961 | Rambo....................| 214/6 H X |
| 3,653,506 | 4/1972 | Turner et al. ...........| 214/6 H X |

*Primary Examiner*—Robert G. Sheridan
*Attorney*—Stephen W. Blore et al., James Campbell, Jr., James Leigh, John R. Hall, Arthur L. Whinston and John P. Dellet

[57] ABSTRACT

Multiple lumber-collecting bins are positioned below a lumber drop sorter. Each bin has a lumber let down apparatus including a series of horizontally extending parallel lumber-supporting arms cantilevered across the bin from a common support tube which travels along a vertical track. A lumber-receiving cable extends diagonally from an inner end of each arm upwardly to an upper portion of a swinging tip pivoted to the free end of each arm and then downwardly to a counterweight below each arm. At the beginning of a collecting cycle lumber drops from the sorter hooks onto the diagonal cables which minimize the fall and build a straight first course of lumber. As additional lumber drops on the cable, it sags progressively until the load is supported directly by the support arms, and the arms gradually lower through the bin. Near the lower end of the bin the swinging tips swing outwardly and the support arms tilt downwardly to gradually spill the load onto a transfer chain defining the bottom of the bin. Thereafter the counterweights return the tips to their upright positions and hoist cables lift the support arms to the upper end of the bin to begin the next loading cycle.

22 Claims, 6 Drawing Figures

APPARATUS FOR COLLECTING AND DISCHARGING LUMBER

BACKGROUND OF THE INVENTION

1. Field of the Invention

The present invention relates to the collection and discharge of lumber, and more particularly to apparatus for accumulating a quantity of lumber beneath a lumber drop sorter and then discharging the load onto a transfer conveyor.

2. Description of the Prior Art

Conventionally, lumber is collected at sorting stations beneath a drop sorter by dropping the lumber from the sorting hooks a considerable distance into carts. Naturally the first boards dropped fall a considerable distance, often damaging them. Also, such boards tend to bounce, and thus skew, causing an uneven build-up of lumber which is difficult to handle. Further damage often occurs while transferring lumber from the bin, either because of the skewed load or the abrupt dumping of the load from the bin, or both. These disadvantages have lead others to experiment with other types of lumber-collecting apparatus. However, none of these have been entirely successful in eliminating lumber damage and skewing. Often, too, prior proposals have either been too costly or too space-consuming for a practical application.

SUMMARY OF THE INVENTION

In accordance with the present invention, a lumber-collecting and discharge apparatus is provided which minimizes the free-fall and therefore the damage to all lumber discharged from the drop sorter. The apparatus furthermore promotes the buildup of a straight, even load of lumber at the sorting station and then finally discharges the load gradually onto a transfer conveyor at the bottom of the sorting bin, all to the end of minimizing damage to the lumber while collecting and discharging as large a load as possible within a minimum space.

The foregoing objectives are accomplished through the use of cantilevered lumber-supporting arms which are gradually lowered through a bin or pocket to define a movable bin floor as a load is built up and lumber-receiving cables for collecting the initial courses of lumber on the arms to minimize free-fall, cushion shock and build a straight first course. A lumber-restraining tip arm at the outer end of each support arm swings outwardly near the lower end of the bin as the support arms are tilted downwardly to provide a support arm extension and thus a controlled release of the load onto the transfer conveyor. A counterweight or other tensioning arrangement maintains the cables taut and returns the swinging arm tip to its initial position following the release of a load.

BRIEF DESCRIPTION OF THE DRAWINGS

The foregoing and other objects, features and advantages of the present invention will become more apparent from the following detailed description which proceeds with reference to the accompanying drawings wherein.

DETAILED DESCRIPTION

Figure 1:
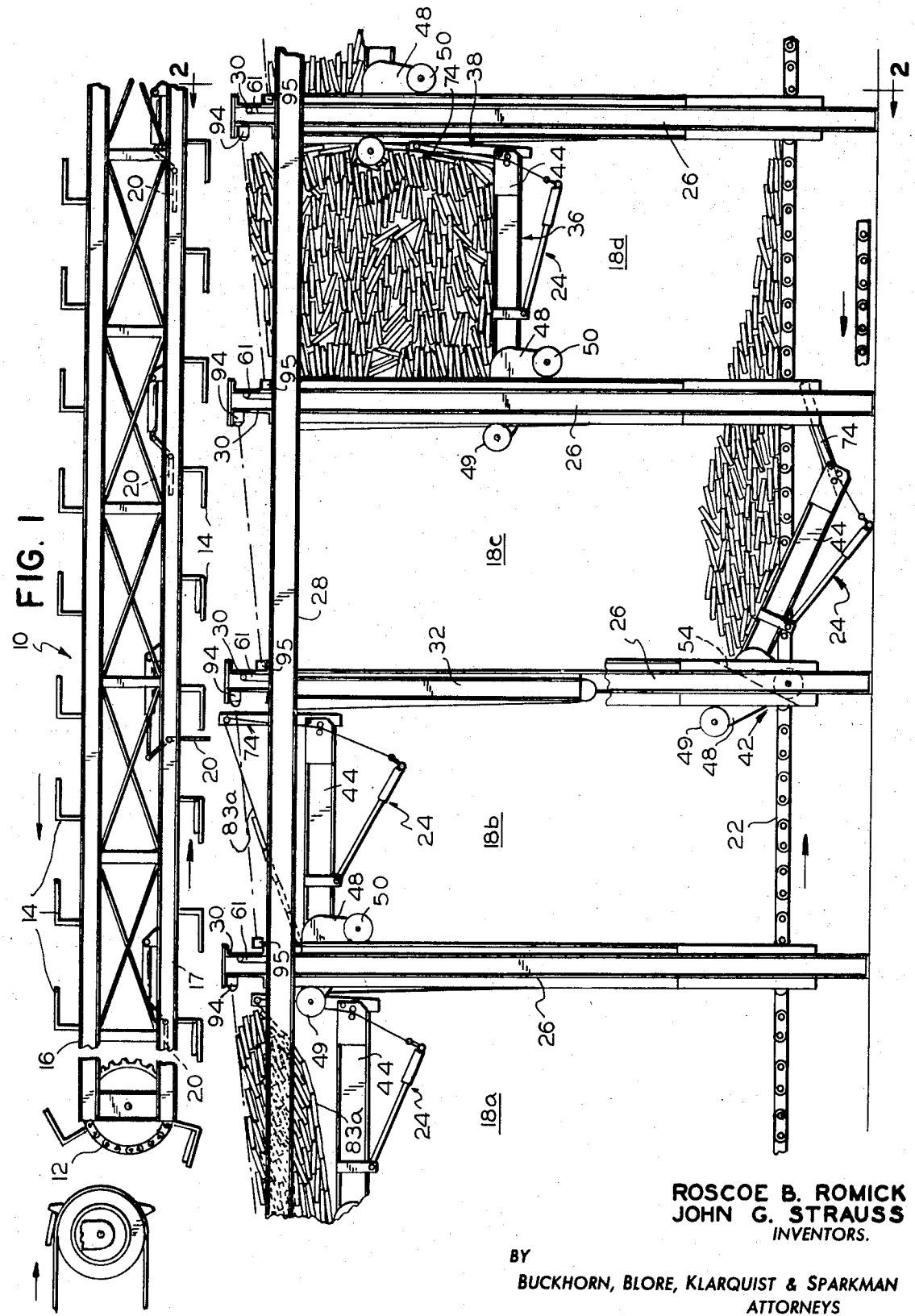
FIG. 1 is a somewhat schematic elevational view of a lumber drop-sorting system including sorting bins having lumber-collecting and discharge apparatus in accordance with the present invention.

With reference to the drawings, FIG. 1 shows a lumber-sorting system including a typical drop sorter 10 comprising a series of laterally spaced parallel endless chains 12 with a series of lumber-carrying hooks 14 at spaced intervals. Such hooks have rollers which ride in upper and lower tracks 16 and 17 respectively. Boards are fed into the hooks at one end of the set of chains and then travel horizontally along the lower run of chains. The boards are deflected from the hooks into selected bins beneath the chains, indicated generally at 18a, 18b, 18c and 18d. The boards may be sorted according to length, width, thickness, grade, or any other desired criteria, as determined at a grading station upstream of the drop sorter. Cylinder-actuated arms 20 over each bin move downwardly into the path of a traveling board to push it from a set of passing hooks into a selected bin. The system described thus far is conventional.

A series of transfer conveyor chains 22 extend longitudinally through the bins and beneath the drop sorter to define a common bottom for all of the bins. Obviously boards dropped from the sorter hooks directly onto the transfer chains or other collecting means at the bottom of the bin would fall through a considerable distance, resulting in a considerable damage to and skewing of the boards. Therefore the present invention concerns an apparatus within each bin for collecting the boards dropped from the sorter hooks and delivering them to the transfer chains 22 in a manner that will minimize damage to and skewing of the boards. Such lumber let down apparatus is shown generally at 24 in various stages of operation in the several bins of FIG. 1.

Each bin 18 is defined by four corner columns 26, with the two columns on each side of the bin being joined together by a common longitudinal beam 28. Each pair of laterally opposed columns are interconnected by a cross beam 30. Additional vertical members 32 extend between top cross beam 30 and an intermediate cross beam 34 as shown in FIG. 2.

Figure 2:
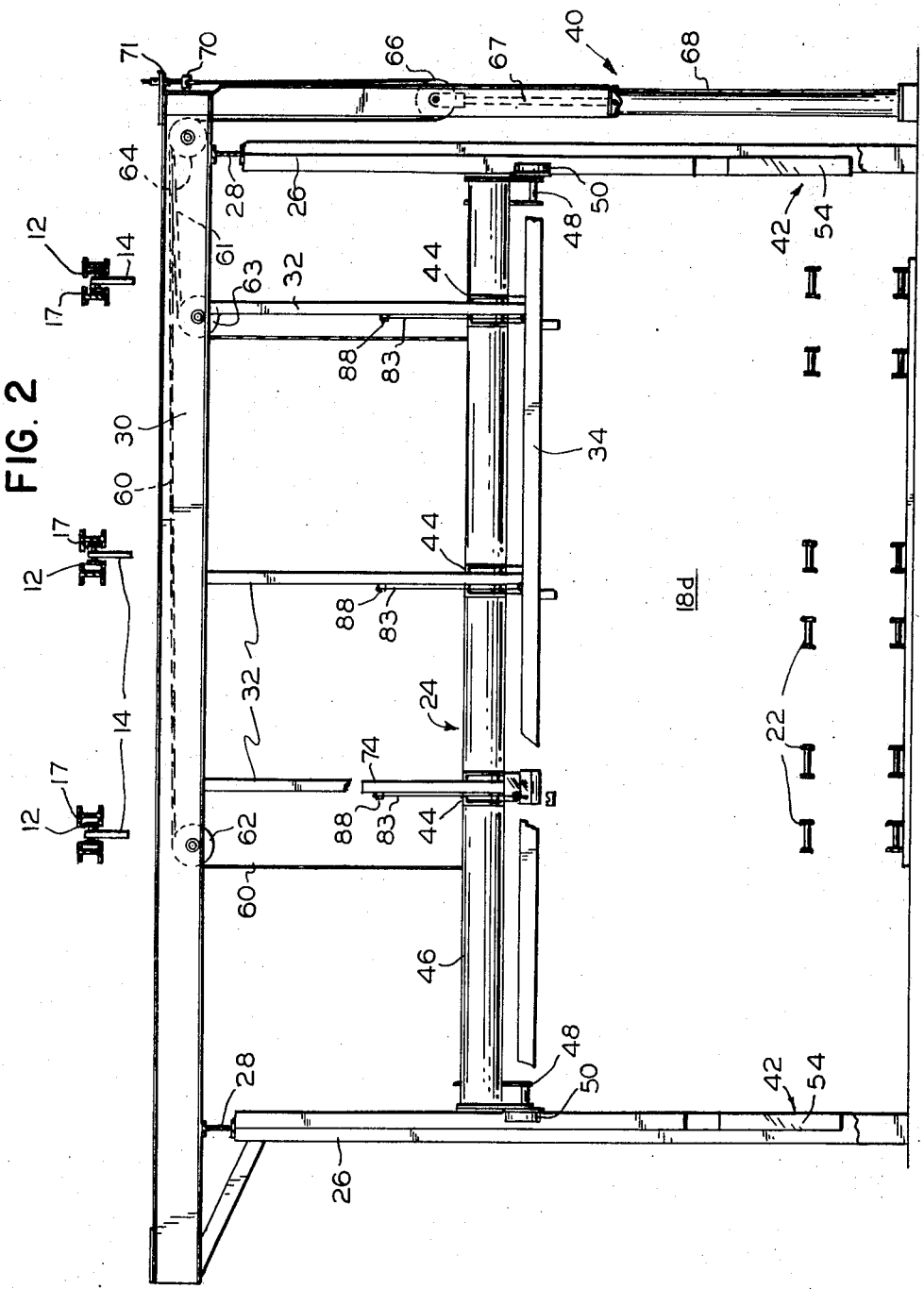
FIG. 2 is a vertical sectional view taken along the line 2—2 of FIG. 1 looking toward the front of one bin.
Figure 3:
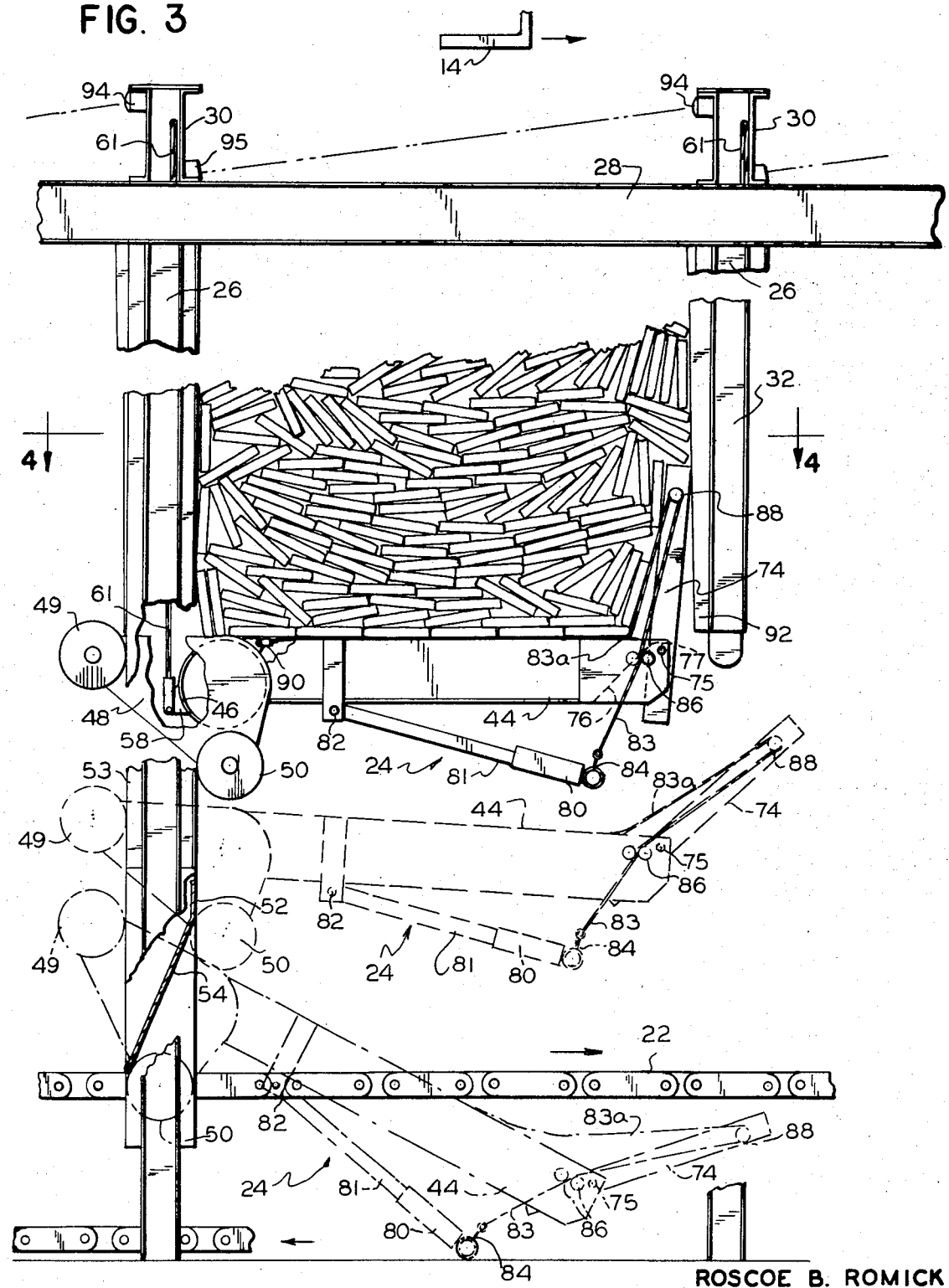
FIG. 3 is a foreshortened side view of the apparatus of one bin on an enlarged scale.
Figure 4:
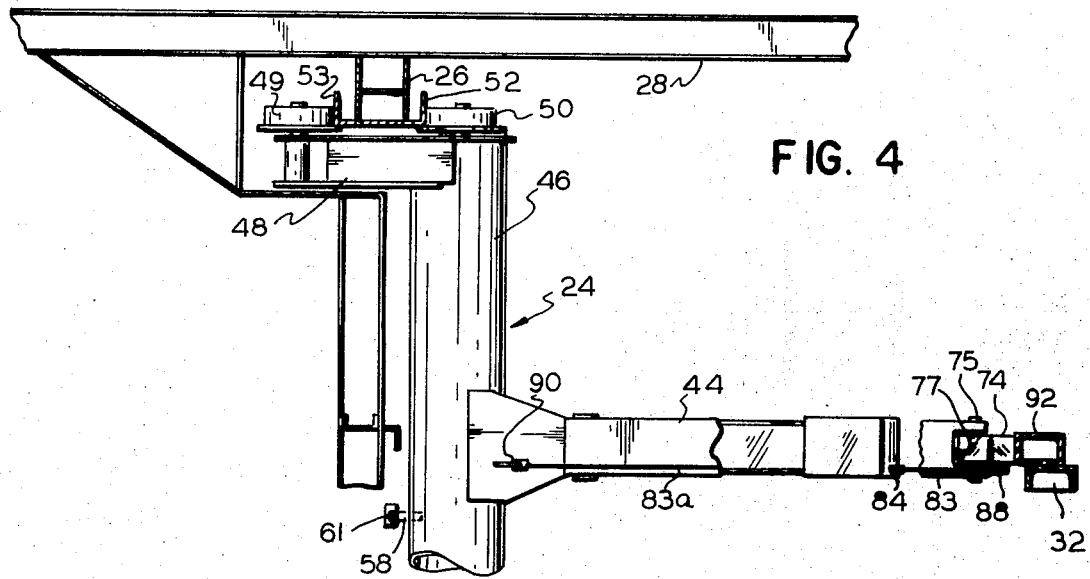
FIG. 4 is a horizontal sectional view taken along the line 4—4 of FIG. 3 showing the lumber-supporting apparatus in plan.

The lumber let down apparatus of the invention is shown in detail in FIGS. 2, 3 and 4. Such apparatus includes a horizontally extending lumber-supporting means indicated generally at 36. Upright means at one end of the supporting means, shown generally at 38, restrains a load of lumber during its downward travel through the bin. Means for lowering the supporting means progressively along its vertical path of travel through the bin is shown generally at 40 in FIG. 2, and means for tilting the lumber-supporting means 36 near the lower limit of its travel is indicated generally at 42.

Each lumber-supporting means comprises a series of cantilever arms or beams 44 joined at one end to a common tubular shaft 46. The shaft carries a bracket 48 at each of its opposite ends on which a pair of wheels 49, 50 are mounted. These wheels are adapted to roll along vertical tracks 52, 53 formed as flanges on the rear corner columns 26 of each bin. The lower end of inside track 52 includes a downwardly and rearwardly inclined section 54 providing the means for tilting the cantilever arms 44 downwardly to discharge their load.

Shaft 46 has a pair of ears 58 on a rearward surface near its opposite ends to which one set of ends of a pair of cables 60, 61 are attached. As shown most clearly in FIG. 2, cable 60 extends upwardly from shaft 46 about a pulley wheel 62 on cross beam 30, then generally horizontally to a second pulley wheel 64 at one end of cross beam 30 and then downwardly and about a sheave 66 on the outer end of the piston rod 67 of a vertically disposed hoist cylinder 68. From sheave 66 cable 60 extends upwardly to a point where it is deadended at 70 on bin plate 71. Cable 61 is reeved in a similar manner except that it proceeds upwardly from cantilever arm shaft 46 about a first pulley wheel 63 before proceeding to pulley wheel 64, sheave 66 and deadend 70. With the foregoing reeving it will be apparent that extension of cylinder 68 lowers shaft 46 and its cantilever arms, whereas retraction of the cylinder raises the shaft and cantilever arms, in a 2:1 ratio of movement of the arm assembly to the cylinder.

The lumber-restraining means comprises a tip arm 74 pivoted at 75 for swinging movement between an upright inactive position generally normal to and within the longitudinal limits of its associated cantilever arm and an outwardly extended, inclined active position of approximately 45° beyond the cantilever arm, these various positions being shown in FIG. 3. The lower portion of tip 74 actually pivots within a socket formed by the outer end of the cantilever arm. Such socket is defined by wall portions 76, 77 which limit the outward and upward pivoting movement, respectively, of the tip.

A counterweight means associated with each cantilever arm maintains the tip arm 74 in its upright position when the cantilever arm is empty. In the embodiment of FIGS. 1 through 4, the counterweight means comprises a counterweight member 80 carried by the outer end of a lever arm 81 extending beneath cantilever arm 44 and hinged to the latter arm at 82. One end of a flexible cable 83 is attached at 84 to the outer end of counterweight arm 81. Cable 83 extends upwardly through a guide 86 positioned inwardly of the pivot axis 75 of tip arm 74 near the outer end of arm 44. From guide 86 the cable proceeds upwardly about a guide roller 88 near the upper end of the tip arm and then, when unloaded, diagonally downwardly toward the inner end of the cantilever arm where it is anchored at 90. The path of the diagonal lumber-receiving portion of the cable 83 is shown in phantom lines at 83a in FIG. 3 and in full lines in bin 18b of FIG. 1.

From the foregoing, it will be apparent that cable 83 in conjunction with the counterweight 80 maintains the tip arm 74 in, or returns it to, an upright position normal to the cantilever arm when the latter arm is unloaded. The cable also serves as a lumber-receiving means to absorb the shock of boards falling from the sorter hooks when the let down apparatus is at the upper end of its bin. The diagonal cable section 83a minimizes the distance through which a board must fall from the sorter hooks 14 into the bins when the cantilever arms of the let down apparatus are empty or nearly empty. As evident from bin 18b in FIG. 1, each board is discharged from the sorter hooks near the high end of the diagonal cable section. The board then slides down the diagonal cable until it abuts the preceding board on the cable. In this manner the first boards dropped into a bin are laid parallel to one another across the cables in edge-abutting relationship to build up a perfectly straight, parallel first course of lumber. This first course serves as a cushion for subsequent boards, thereby promoting the buildup of straight subsequent courses on the arms with little if any skewing or damage. Boards subsequent to the first course dropped onto the let down apparatus gradually cause the diagonal cables to sag until the load is supported entirely on the cantilever arms rather than on the cables, as shown in solid lines in FIG. 3.

From FIG. 3 it will be noted that the outer portion of lumber-receiving cable 83 extending between the outer end of counterweight arm 81 and guide 86 is at a sharper angle to the vertical than the portion of the cable extending upwardly from guide 86. As counterweight arm 81 swings upwardly under the increasing weight of lumber on diagonal cable section 83a, such angle increases, thereby increasing progressively the bight of cable 83 on guide 86 and thus the resistance of cable section 83a to sag under the weight of the increased load. This ensures that at least a full course and usually more builds up on the diagonal cables before they descend under load.

As lumber builds up on the cantilever arms and against the tip arm 74, the load tends to force tip arm 74 outwardly from its near-vertical position. However, a restraining means is provided to maintain the tip arm in a generally upright position under load. This restraining means is provided by the skid portions 92 of interior vertical bin wall members 32. As the cantilever arms move downwardly through the bin, the upper ends of the tips ride along these skids.

Means are also provided to maintain the load on the cantilever support arms at a near-constant upper level within the bin. Such means includes an electric eye unit 94 at the upper end of each bin aimed at a retroreflective target 95 across the top of the bin. As a load builds up sufficient to interrupt the beam from the electric eye, the hydraulic cylinder is extended to lower the cantilever support arms in steps. A time delay (not shown) is provided in the electric eye control circuit to prevent individual boards dropped from the sorter hooks from jogging the cantilever arms down through the bin. When the let down apparatus reaches its lower limit position, a suitable limit switch (not shown) is triggered to return the apparatus to its upper limit position where another limit switch conditions the unit for another cycle of operation.

FIG. 5 Embodiment

Figure 5:
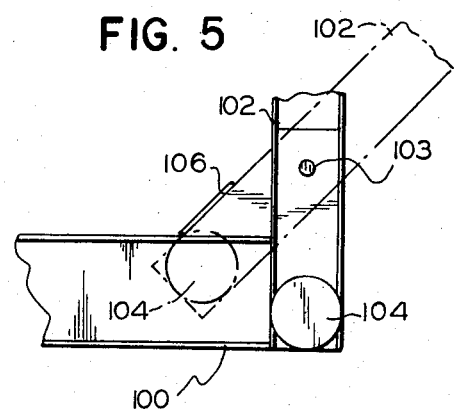
FIGS. 5 and 6 are partial side and front views, respectively, of a modified form of the apparatus in accordance with the invention.
Figure 6:
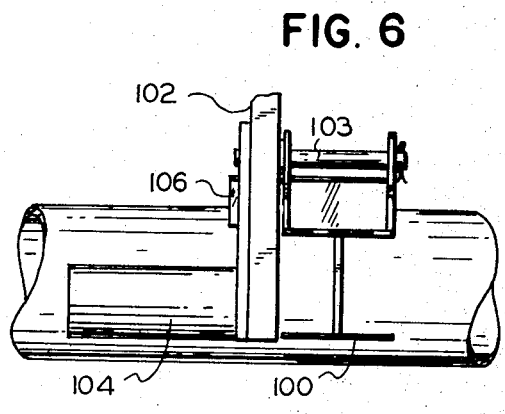

FIGS. 5 and 6 illustrate a modification of the invention wherein no diagonally extending lumber-receiving cable is used to build up an initial course of lumber. Instead the cantilever support arms 100 of each let down apparatus receive all boards directly. Each cantilever arm has a tip arm 102 pivoted at 103 to its outer end.

The portion of tip arm 102 below the pivot axis 103 is provided with a cylindrical counterweight 104. When the upper ends of tips 102 pass beneath the restraining portions of the bin walls, lumber on each support arm 100 forces tip 102 outwardly until the lower part of tip 102 strikes a diagonally extending stop plate 106, at approximately a 45° angle to the cantilever arm. This action is similar to the action of the tip in the FIG. 1 form of the invention and provides the same controlled, gradual release of a load onto the transfer chains as the cantilever arms tilt downwardly. After the load is discharged from the cantilever arms, counterweight 104 automatically returns the tip arm 102 to its initial position normal to the cantilever arm, permitting return of the apparatus to the upper end of its bin.

OPERATION

Referring to the embodiment of FIG. 1, initially the let down apparatus is positioned at the upper end of the bin, as shown with respect to bin 18b. The diagonal cable section 83a of each arm is taut, and the cable's uppermost portion extends to a point just beneath the horizontally traveling hooks 14 of the drop sorter. As the first course of boards builds up on cable 83 to an extent sufficient to interrupt the beam of electric eye 94, the hoist cylinder is extended a short distance until the upper level of boards in the bin is again below the beam. The additional buildup of boards on cables 83 will cause them to sag, as shown with respect to bin 18a, until the load is sufficient to collapse the cable against the cantilever arms 44 as shown in bin 18d. The electric eye maintains the load at a substantially constant upper lever within the bin as the cantilever arms are lowered in steps through the bin.

The buildup of a load on cantilever arms 44 and progressive downward travel of such arms continue until the upper ends of tip arms 74 clear the lower end of tip-restraining skids 92. Thereafter, the load on arms 44 forces tips 74 to swing outwardly to their 45° positions, overcoming the tendency of counterweight 80 to maintain the tip vertical. At about the same time wheels 50 of the cantilever arm assembly ride onto the inclined section 54 of track 52, thereby causing the cantilever arms 44 to begin tilting downwardly. As wheels 50 continue to ride down inclined track sections 54, the tilting of cantilever arms 44 becomes progressively more severe as indicated by the progressive positions 44a–74a and 44b–74b of the cantilever arms and tip arms, as shown in FIG. 3. As a result, the load of lumber carried on such arms is gradually spilled onto transfer chains 22 at a controlled rate, as shown in bin 18c of FIG. 1, minimizing board damage and skewing during discharge. By the time wheels 50 reach the lower end of inclined track section 54, tip 74 is in position 74b, entirely below the transfer chains, thereby completely emptying the cantilever arms of their package. At this point a limit switch (not shown) tripped by the arm assembly stops the hoist cylinder. The transfer chain can be activated and the let down apparatus returned to its upper position when emptied either automatically or by manual actuation of an appropriate control switch as desired. The release of the load from tip arms 74 enables the counterweights 80 to return such tip arms to their initial positions normal to their cantilever arms. The counterweight arms also cause cable sections 83a to return to their diagonal dispositions in readiness to receive the first course of the next lumber-loading cycle.

Another advantage of counterweight arm 81 is its ability to swing counterweight 80 up out of the way of a load from one bin passing along the transfer chains beneath the cantilever arms of another bin, should such load be high enough to strike arm 81.

The drop sorter can be programmed to bypass a bin during the time that the let down apparatus of such bin is discharging its load onto the transfer chain and returning to its upper position.

As shown in FIG. 3, vertical bin wall member 32 may be provided with a projection 32a extending below the lower terminus of skid portion 92 at a position offset from such skid portion. Such projection on each bin serves as a rake means to prevent an excessive buildup of boards traveling along the transfer chain that might otherwise interfere with the operation of the let down apparatus of other bins.

The difference between the operation and functioning of the embodiments of FIGS. 1 and 5 is provided by the absence of the lumber-receiving cable in the latter embodiment. Thus in the embodiment of FIG. 5, the initial courses of lumber fall directly from the sorter hooks onto the support arms 44 rather than on diagonal cables. Thus the FIG. 5 embodiment would have a slightly greater tendency to skew and damage the first few boards dropped onto the support arms than would the FIG. 1 embodiment. However, the FIG. 5 embodiment would normally be less costly to manufacture and maintain.

Having illustrated two preferred embodiments of the invention, it should be apparent to those skilled in the art that the same permit of modification in arrangement and detail. We claim as our invention all such modifications as come within the true spirit and scope of the following claims.

We claim:

1. A lumber receiver comprising:
   lumber-supporting means,
   hoist means for lowering said supporting means progressively from an upper portion of a lumber-collecting pocket to a lower portion thereof as lumber builds up on said supporting means,
   means for tilting said supporting means downwardly at a lower portion of said pocket to cause lumber to spill from said supporting means,
   lumber-restraining means extensible from an end portion of said supporting means,
   means for maintaining said restraining means in an inactive position substantially within the longitudinally outer limits of said supporting means during downward travel of said supporting means under load through an upper portion of said pocket,
   said restraining means being extensible longitudinally beyond said supporting means in a lower portion of said pocket with said supporting means under load to provide a controlled release of lumber from said supporting means as said supporting means tilts downwardly.

2. Apparatus according to claim 1 including feed means for feeding lumber onto said supporting means from above said supporting means and transfer means at the lower portion of said pocket for receiving and conveying lumber spilled from said supporting means.

3. Apparatus according to claim 2 wherein said feed means comprises a drop sorter.

4. Apparatus according to claim 2 wherein said feed means comprises a drop sorter and said supporting means includes a plurality of supporting devices positioned within multiple lumber-receiving pockets beneath said drop sorter, said transfer means including a transfer conveyor means extending longitudinally beneath said drop sorter and defining a bottom of said pockets.

5. Apparatus according to claim 1 wherein said restraining means is pivoted to an outer portion of said supporting means and extends upwardly therefrom in said upper portion of said pocket and swings outwardly beyond said outer portion of said supporting means when in said lower portion of said pocket under the influence of a load on said supporting means.

6. Apparatus according to claim 1 including means for returning said restraining means to its inactive position following release of a load.

7. Apparatus according to claim 6 wherein said returning means comprises a counterweight means operably connected to said restraining means.

8. Apparatus according to claim 1 including lumber-receiving cable means extending across an upper portion of said supporting means, said cable means being connected to cable-tensioning means operable to dispose said cable means in a position spaced above said supporting means during the buildup of a first course of lumber thereon and yet permit progressive sagging of said cable means toward said supporting means as a load of lumber builds up on said cable means.

9. Apparatus according to claim 8 wherein said cable means extends initially diagonally across said supporting means for supporting a first course of lumber across said cable means above said supporting means.

10. Apparatus according to claim 8 wherein said cable means extends diagonally from an outer portion of said restraining means to an inner portion of said supporting means for receiving a first course of lumber.

11. Apparatus according to claim 8 wherein said cable means is anchored at one end to one end portion of said supporting means and extends upwardly to a portion of said restraining means at an opposite end portion of said supporting means and then downwardly to said tensioning means, said tensioning means comprising a counterweight means.

12. Apparatus according to claim 11 wherein said counterweight means is carried at the outer end of a lever arm below said supporting means, the inner end of said lever arm being hinged to said supporting means for vertical swinging movement, said counterweight means and downwardly extending portion of said cable means being positioned relative to a pivot connection of said restraining means with said supporting means so as to return said restraining means to its initial inactive position following release of a load from said supporting means.

13. Apparatus according to claim 1 wherein said supporting means comprises at least two cantilever arms fixed at one end of each to a common shaft, said shaft including wheel means movable along a track means extending lengthwise of said pocket, said tilting means including an inclined track section of said track means positioned along a lower portion of said pocket.

14. Apparatus according to claim 13 including a tip arm pivoted to a free end portion of each said cantilever arm, said tip arm extending from said free end portion and being capable of swinging movement from said inactive position outwardly beyond the free end of said cantilever arm to define an extension of said cantilever arm, and counterweight means operably connected to said tip arm in a manner tending to maintain said tip arm in said inactive position.

15. Apparatus for collecting and transferring lumber beneath a drop sorter or other lumber discharge apparatus comprising:
   lumber-supporting means,
   means for tilting said supporting means from a lumber-supporting position to a lumber-discharging position,
   lumber-restraining means pivoted to an end portion of said lumber-supporting means and extending from said supporting means so as to help contain a load of lumber on said supporting means in the lumber-supporting position thereof,
   said lumber-restraining means being capable of swinging movement from its lumber-containing position outwardly beyond said end portion to a release position,
   and means biasing said restraining means in its containing position but being operable to permit outward swinging movement thereof under load during tilting movement of said supporting means so as to provide a controlled release of lumber from said supporting means.

16. Apparatus according to claim 15 wherein said lumber-supporting means is movable bodily within a lumber-sorting bin from an upper receiving position adjacent a lumber-sorting mechanism to a lower discharge position adjacent a means for transferring lumber from said bin.

17. Apparatus according to claim 15 including lumber-receiving cable means extending across an upper portion of said supporting means in an initial position above said supporting means for receiving and supporting at least the first several boards discharged toward said supporting means, said cable means being connected to tension means operable to lower said cable means toward said support means as a load builds up on said cable means.

18. Apparatus for handling lumber within a lumber-collecting pocket having an upper end through which lumber is discharged into said pocket and a lower end from which lumber is removed from said pocket, said apparatus comprising:
   lumber-supporting means mounted for movement lengthwise through said pocket from said upper end toward said lower end,
   hoist means for moving said supporting means through said pocket, said hoist means being operable to lower said supporting means progressively through said pocket as a load builds up on said supporting means,
   and lumber-receiving flexible cable means extending across an upper portion of said supporting means, said cable means being disposed so as to receive and support boards discharged into said pocket at a level above said support means when said support means is at its upper limit of travel within said pocket, and cable-tensioning means operable to lower said cable means and its supported load onto said supporting means as said load builds up on said cable means, whereby said cable means acts to limit the fall and absorb the shock of the first several boards discharged into said pocket.

19. Apparatus according to claim 18 including means for tilting said supporting means in a lower portion of said pocket from its lumber-supporting position to a position for discharging a load from said supporting means, said tensioning means being operable following discharge of a load to return said cable means to its initial board-receiving disposition.

20. Apparatus according to claim 18 wherein said cable means extends diagonally above said supporting means in its initial board-receiving and supporting position from a high point spaced above the level of said supporting means to a lower point closer to the level of said supporting means.

21. Apparatus according to claim 18 including load-restraining means at an end portion of said supporting means, and means for tilting said end portion downwardly for discharging a load from said supporting means, said restraining means defining an extension of said supporting means outwardly beyond said end portion during tilting movement of said supporting means under load so as to provide a controlled discharge of said load from said supporting means.

22. Apparatus according to claim 1 wherein said supporting means extends generally horizontally across said pocket into its load-supporting position and said restraining means is pivoted to a downwardly tiltable end of said supporting means, said restraining means in its inactive position extending upwardly from said supporting means in a direction generally paralleling the direction of travel of said supporting means through said pocket, and restraining means swinging outwardly during tilting movement of said supporting means under load to define an extension of said supporting means beyond said end and beyond said pocket so as to provide a controlled discharge of said load from said supporting means and pocket.

* * * * *